(12) United States Patent
Huang

(10) Patent No.: US 12,057,735 B2
(45) Date of Patent: Aug. 6, 2024

(54) POWER SUPPLY APPARATUS FOR SUPPLYING POWER WITH A BATTERY UNIT INTEGRALLY COMBINED WITH A SUPERCAPACITOR

(71) Applicant: Yung-Sheng Huang, Taipei (TW)

(72) Inventor: Yung-Sheng Huang, Taipei (TW)

( * ) Notice: Subject to any disclaimer, the term of this patent is extended or adjusted under 35 U.S.C. 154(b) by 0 days.

(21) Appl. No.: 17/686,442

(22) Filed: Mar. 4, 2022

(65) Prior Publication Data

US 2023/0261506 A1     Aug. 17, 2023

(51) Int. Cl.
   *H02J 7/34*      (2006.01)
   *B60R 16/033*    (2006.01)
   *H02J 7/00*      (2006.01)
   *H02M 3/158*     (2006.01)

(52) U.S. Cl.
   CPC ............ *H02J 7/345* (2013.01); *B60R 16/033* (2013.01); *H02J 7/0047* (2013.01); *H02J 7/0063* (2013.01); *H02J 7/007182* (2020.01); *H02M 3/1582* (2013.01)

(58) Field of Classification Search
   CPC .... H02J 7/345; H02J 7/007182; H02J 7/0047; H02J 7/0063; B60R 16/033; H02M 3/1582
   See application file for complete search history.

(56) References Cited

U.S. PATENT DOCUMENTS

| | | | |
|---|---|---|---|
| 2003/0214270 A1 | 11/2003 | Shiue et al. | |
| 2007/0182248 A1 | 8/2007 | Blaker et al. | |
| 2008/0111524 A1 | 5/2008 | Rydman et al. | |
| 2009/0096285 A1 | 4/2009 | Acena et al. | |
| 2009/0179613 A1* | 7/2009 | Masho ................ | H02M 3/1582 320/167 |
| 2014/0306519 A1* | 10/2014 | Song ...................... | B60L 58/19 320/134 |
| 2019/0047433 A1* | 2/2019 | Rozman ................ | B60W 20/00 |
| 2021/0342844 A1* | 11/2021 | Huang ................... | G06Q 20/10 |
| 2022/0149648 A1* | 5/2022 | Ho .......................... | H02J 7/345 |

OTHER PUBLICATIONS

International Search Report for PCT/US2023/014315, Sep. 7, 2023.

* cited by examiner

*Primary Examiner* — Jared Fureman
*Assistant Examiner* — Duc M Pham
(74) *Attorney, Agent, or Firm* — Jackson IPG PLLC; Demian K. Jackson

(57) ABSTRACT

A power supply apparatus is proposed, which uses a battery unit integrally combined with a supercapacitor for supplying power to a load of the type that requires an initial instant large current for quick startup, such as the engine startup motor of an automobile. in operation, the invention uses both the battery unit and the supercapacitor to supply power to the load, characterized in that the supplied power contains an initial instant large current for quick startup of the load. When recharging is required, an external recharging power unit can be used to recharge both the battery unit and the supercapacitor, In the application on automobiles, the invention can replace traditional lead-acid batteries for supplying power with an initial instant large current to the engine startup motor of the automobile, thereby allowing the startup motor to produce a more powerful and rapid accelerating force for quick engine startup.

10 Claims, 6 Drawing Sheets

POWER SUPPLY APPARATUS FOR SUPPLYING POWER WITH A BATTERY UNIT INTEGRALLY COMBINED WITH A SUPERCAPACITOR

BACKGROUND OF THE INVENTION

1. Field of the Invention:

The invention relates to power supply technology, and more particularly to a power supply apparatus that uses a battery unit integrally combined with a supercapacitor for supplying power to a load of the type that requires an initial instant large current for quick startup, such as the engine startup motor of an automobile.

2. Description of Related Art:

The automobile is a common and widely used means for transportation which is typically powered by a gasoline-based engine. Traditionally, in order to start the engine of an automobile, a startup motor combined with a lead-acid battery is used for ignition and startup of the automobile engine.

One problem in the use of the lead-acid battery for supplying power to the automobile engine startup motor, however, is that it has a slow discharging and charging speed and is only able to supply a small amount of current at the initial instance when the battery is connected to the load. Therefore, as an undesired result, the small initial current can only drive the startup motor to produce a small accelerating force, which results in a slow startup of the automobile engine.

In view of the above-mentioned problem, there exists therefore a need in the automobile industry for a solution that can be used for supplying power with an initial instant large current to the automobile engine startup motor so as to allow the startup motor to produce an initially more powerful and rapid accelerating force for quick startup of the automobile engine.

SUMMARY OF THE INVENTION

It is therefore the primary objective of this invention to provide a solution to the above-mentioned problem which can be used to replace traditional lead-acid batteries for supplying power with an initial instant large current to the engine startup motor of the automobile, thereby allowing the startup motor to produce an initially more powerful and rapid accelerating force for quick engine startup.

However, broadly speaking, the power supply apparatus of the invention is not limited to the application on an automobile engine startup motor, and can be used to supply power to any type of load that requires an initial instant large current for quick startup. Fundamentally, the power supply apparatus of the invention comprises: (a) a battery unit; (b) a supercapacitor; (c) a switch unit; (d) a bidirectional voltage buck/boost converter unit; (e) a first voltage-sensing unit; (f) a second voltage-sensing unit; and (g) a main control unit.

In operation, the power supply apparatus of the invention continues to monitor whether the load or the external recharging power unit is activated. If the load is activated, the power supply apparatus of the invention is triggered to operate in the discharging mode and thereby supply power to the load; whereas if the external recharging power unit is activated, the power supply apparatus of the invention is triggered to operate in the recharging mode and thereby allow the external recharging power unit to supply a recharging voltage for recharging both the battery unit and the supercapacitor.

When the load is activated, the power supply apparatus of the invention will be triggered to respond by performing a discharging control procedure whereby the switch unit is switched to ON state while the bidirectional voltage buck/boost converter unit is switched to a forward buck mode, thus allowing the supercapacitor to supply an initial instant large current via. the switch unit to the load, and meanwhile allowing the battery unit to supply power via the bidirectional voltage buck/boost converter unit to the load.

On the other hand, when the external recharging power unit is activated, the power supply apparatus of the invention will be triggered to respond by performing a recharging control procedure whereby the switch unit is switched to ON state while the bidirectional voltage buck/boost converter unit is switched to a reverse boost mode, thus allowing the external recharging power unit to supply recharging power via the switch unit to the supercapacitor and via the bidirectional voltage buck/boost converter unit to the battery unit.

In the discharging mode, the power supply apparatus of the invention allows the supercapacitor to supply an initial instant large current via the switch unit to the load, and meanwhile allows the battery unit to supply a steady current via the bidirectional voltage buck/boost converter unit to the load.

On the other hand, in the recharging mode, the power supply apparatus of the invention allows the external recharging power unit to supply the recharging power via the switch unit to the supercapacitor, and meanwhile allows the external recharging power unit to supply the recharging power via the recharging channel of the bidirectional voltage buck/boost converter unit to the battery unit.

In conclusion, the invention provides a power supply apparatus that uses a battery unit integrally combined with a supercapacitor for supply power to a load, characterized in that the supplied power contains an initial instant large current. When recharging is required, an external recharging power unit can be activated to supply recharging power to both the supercapacitor and the battery unit. The invention therefore represents a solution to the problem mentioned in the background section and thus can be used to replace traditional lead-acid batteries for supplying power with an initial instant large current to the engine startup motor of the automobile, thereby allowing the engine startup motor to produce a more powerful and rapid accelerating force for quick startup.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The present invention proposes a novel power supply apparatus that uses a battery unit integrally combined with a supercapacitor for supplying power to a load, which is disclosed in full details by way of preferred embodiments in the following with reference to the accompanying drawings.

Figure 1:
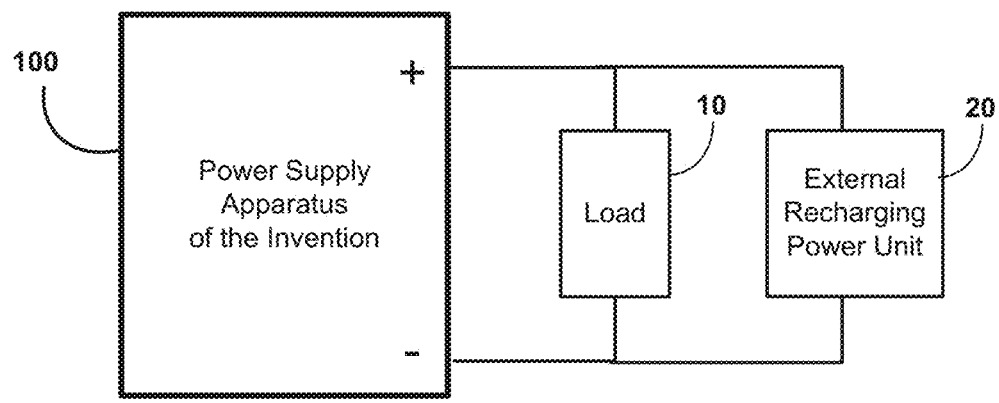
FIG. 1 is a schematic diagram showing the application of the power supply apparatus of the invention when connected to a load and an external recharging power unit.

FIG. 1 is a schematic diagram showing the application of the power supply apparatus of the invention which is represented here by a box indicated by the reference numeral 100. As shown, in practical application, the power supply apparatus of the invention 100 is connected to a load 10 and an external recharging power unit 20, The load 10 is a type of load that specifically requires an initial instant large current for quick startup at the initial instance of time when the load 10 is powered on, such as the startup motor used for starting the engine of an automobile. When the power supply apparatus of the invention 100 is depleted of power, it can be recharged by using the external recharging power unit 20.

Figure 2:
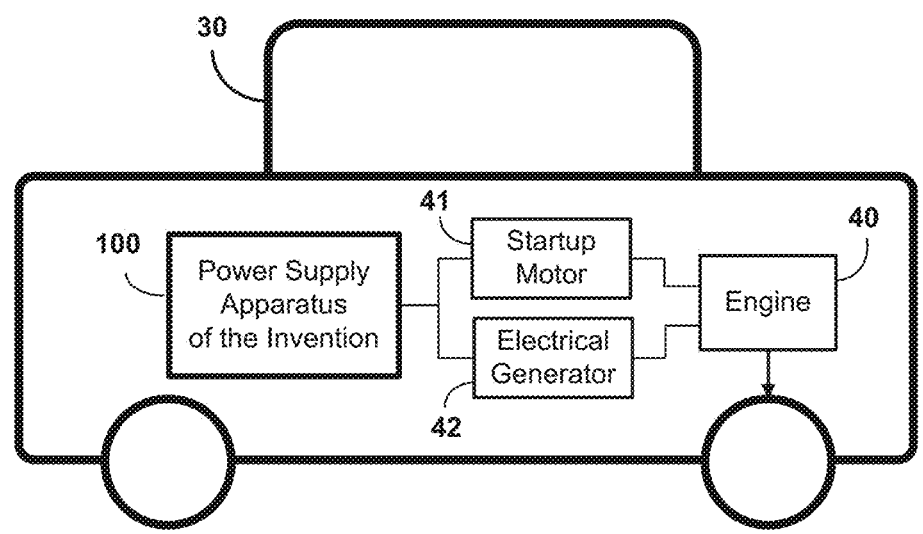
FIG. 2 is a schematic diagram showing a practical application in which the power supply apparatus of the invention is installed on an automatable.
Figure 3:
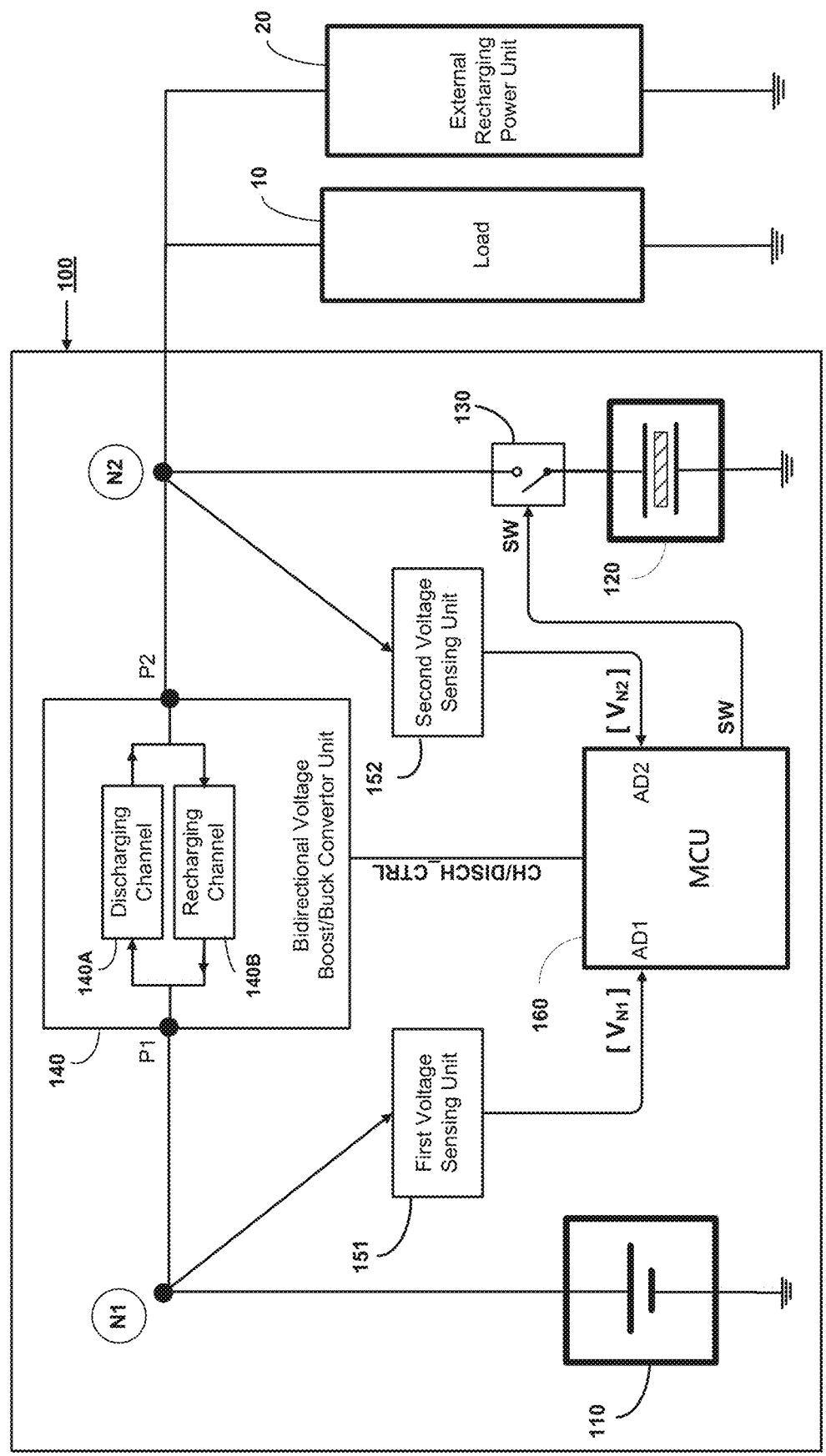
FIG. 3 is a schematic diagram showing the internal architecture of the power supply apparatus of the invention.
Figure 4A:
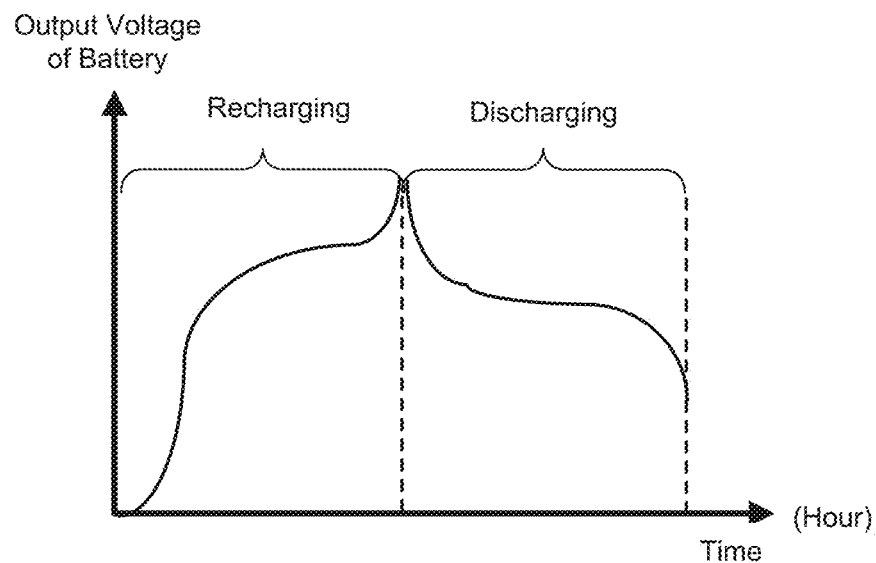
FIG. 4A is a waveform diagram showing the electrical charging and discharging characteristics of a lithium battery unit.
Figure 4B:
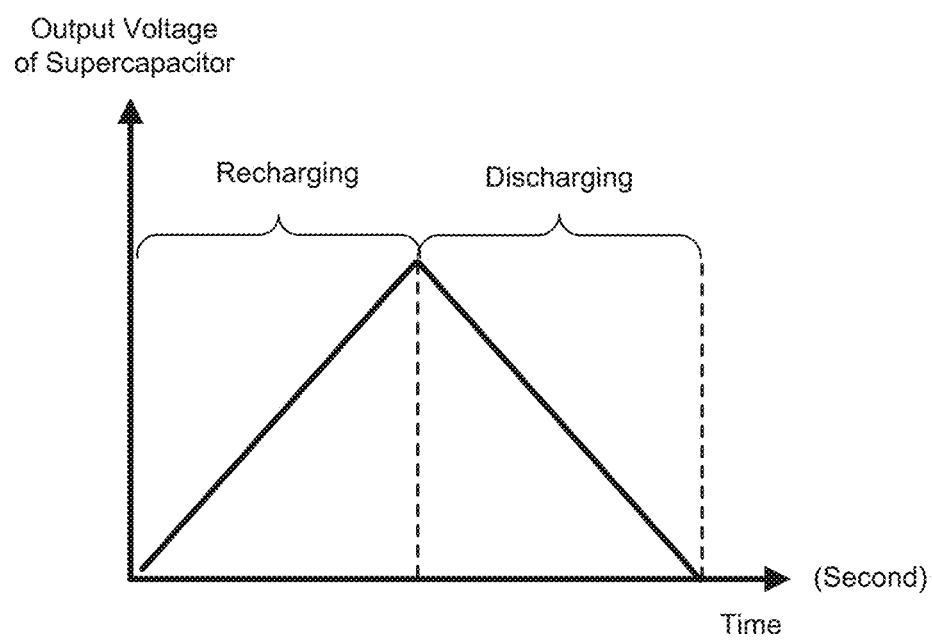
FIG. 4B is a waveform diagram showing the electrical charging and discharging characteristics of a supercapacitor.

FIG. 2 shows an example of the practical application of the power supply apparatus of the invention 100 on an automobile 30. As shown, the automobile 30 is driven by an engine 40 which includes a startup motor 41 and an electrical generator 42, The startup motor 41 is used for startup and ignition of the engine 40 when the automobile 30 is started. After the engine 40 is started, it can also drive the electrical generator 42 to generate electricity. In this practical application, the power supply apparatus of the invention 100 is used for supplying power to the startup motor 41, while the electricity generated by the electrical generator 42 can be used to recharge the power supply apparatus of the invention 100. That is, the startup motor 41 shown in FIG. 2 serves as the load 10 shown in FIG. 1, while the electrical generator 42 serves as the external recharging power unit 20 shown in FIG. 1.

However, broadly speaking, the power supply apparatus of the invention 100 is not limited to the application shown in FIG, 2 for installation on an automobile 30 to supply power to the startup motor 41, and instead the invention can be used to supply power to any type of load that requires an initial instant large current for quick startup.

FIG, 3 shows the architecture of the power supply apparatus of the invention 100, which comprises: (a) a battery unit 110; (b) a supercapacitor 120; (c) a switch unit 130; (d) a bidirectional voltage buck/boost converter unit 140; (e) a first voltage-sensing unit 151; (f) a second voltage-sensing unit 152; and (g) a main control unit 160. These constituent elements of the power supply apparatus of the invention 100 are respectively described in details in the following.

The battery unit 110 is, for example, a rechargeable lithium battery, which can be used supply a DC voltage, The output end of the battery unit 110 is connected to a first node N1 which is subsequently connected via the bidirectional voltage buck/boost converter unit 140 to a second node N2. The second node N2 is connected to the output port of the power supply apparatus of the invention 100 which is externally connected to the load 10. FIG, 4A is a waveform diagram showing the discharging and recharging characteristics of a typical lithium battery that serves as the battery unit 110. It can be seen from this diagram that the lithium battery has the disadvantage that it is unable to supply an initial instant large current at the initial instance of time when it is connected to the load 10, and is only able to slowly supply a small amount of current, The advantage of the lithium battery, however, is that it has a large storage capacity to supply power continuously for an elongated period of time, typically several hours, The supercapacitor 120 is also called ultracapacitor, which is a special type of capacitor that has a supercapacitance much larger than ordinary capacitors, which is defined here as a capacitance that is as much as or greater than 0.1 farad (F). The supercapacitor 120 is connected via the switch unit 130 to the second node N2 which is connected externally to the load 10 and the external recharging power unit 20. In operation, when the switch unit 130 is switched to ON state, the supercapacitor 120 can supply an initial instant large current via the switch unit 130 to the load 10. FIG, 4B is a waveform diagram showing the discharging and recharging characteristics of the supercapacitor 120. It can be seen from this diagram that the supercapacitor 120 has the advantage that when initially connected to the load 10, it is able to supply an initial instant large current. Moreover, in recharging operation, the supercapacitor 120 can be recharged to its fully capacity very quickly. However, the disadvantage of the supercapacitor 120 is that it can supply power only for a very short period of time, typically only several seconds.

The switch unit 130 is connected between the supercapacitor 120 and the second node N2, and whose ON/OFF state is controlled by a switch-control signal SW issued by the main control unit 160. When the switch unit 130 is switched to ON state, it connects the supercapacitor 120 to the second node N2, thereby allowing the supercapacitor 120 to supply an initial instant large current via the switch unit 130 to the load 10. Whereas when the switch unit 130 is switched to OFF state, it disconnects the supercapacitor 120 from the load 10, In practice, for example, the switch unit 130 can be implemented with an electromechanical relay, a solid-state relay (SSR), or a transistor-based electronic switch.

The bidirectional voltage buck/boost converter unit 140 has two ports P1 and P2, wherein the first port P1 is connected to the first node N1, while the second port P2 is connected to the second node N2. The bidirectional voltage buck/boost converter unit 140 can be operationally controlled by the main control unit 160 to switch the electrical conducting path from P1 to P2 between two channels: a discharging channel 140A and a recharging channel 140B. The bidirectional voltage buck/boost converter unit 140 thus can be switched between two operating modes: (1) a forward buck mode via the discharging channel 140A; and (2) a reverse boost mode via the recharging channel 140B, in the forward buck mode, the first port P1 serves as an input end, while the second port P2 serves as an output end, allowing the output voltage of the battery unit 110 at the first node N1 to be discharged via the discharging channel 140A of the bidirectional voltage buck/boost converter unit 140 to the load 10. Whereas in the reverse boost mode, the second port P2 serves as an input end, while the first port P1 serves as an output end, allowing the output power of the external recharging power unit 20 to be used to recharge the battery unit 110 via the recharging channel 140B of the bidirectional voltage buck/boost converter unit 140. These two operating modes are switchably controlled by a charging/discharging control signal CH/DISCH_CTRL from the main control unit 160.

Figure 5:
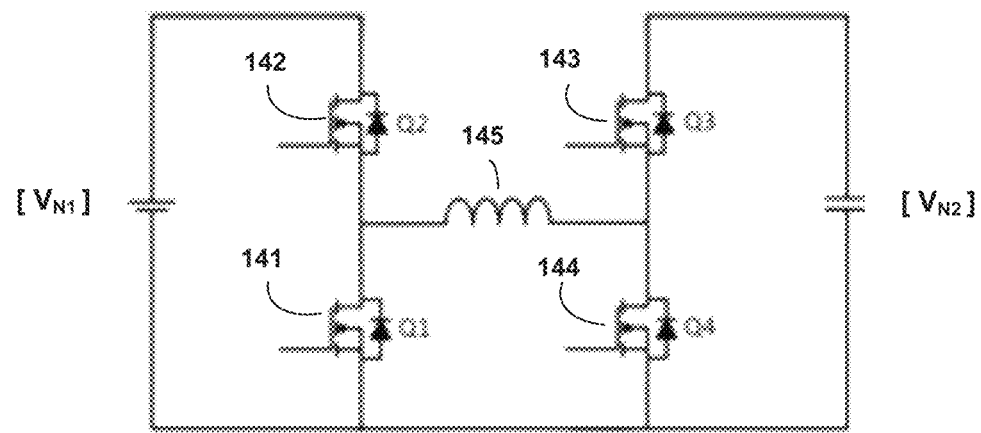
FIG. 5 is a schematic diagram showing the circuit architecture of a bidirectional voltage buck/boost converter unit utilized by the power supply apparatus of the invention.

In practice, for example, the bidirectional voltage buck/boost converter unit 140 can be implemented with a four-transistor type of voltage boost/buck convertor circuit shown in FIG. 5, which is composed of a first transistor (Q1) 141, a second transistor (Q2) 142, a third transistor (Q3) 143, a fourth transistor (Q4) 144, and a inductor 145.

Figure 6A:
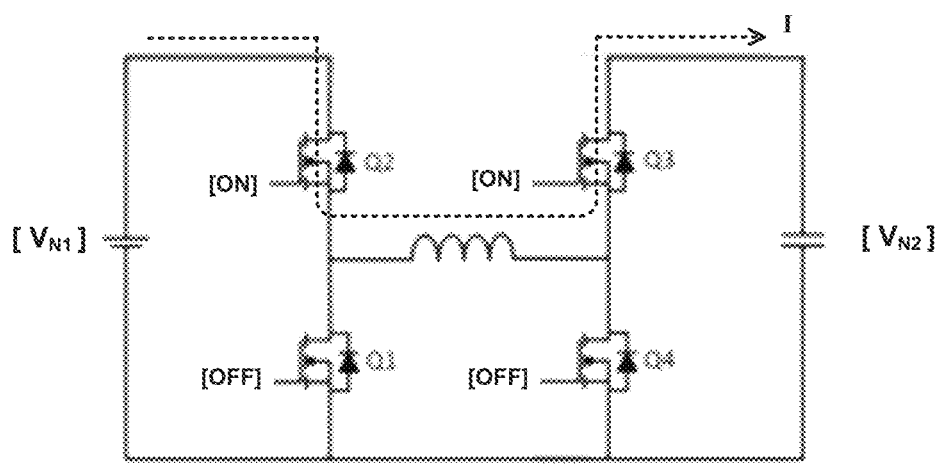
FIG. 6A is a schematic diagram showing bidirectional voltage buck/boost converter unit of FIG. 5 when being switched to a standby power supply mode.

In operation, the voltage boost/buck convertor circuit shown in FIG. 5 includes three operating modes: (1) a standby power supply mode as shown in FIG. 6A; (2) a forward buck mode shown FIG. 6B; and (3) a reverse boost mode shown in FIG. 6C. These three operating modes are all switchably controlled by the main control unit 160.

In the standby power supply mode shown in FIG. 6A, the transistors (Q1, Q2, Q3, Q4) are respectively switched by the control signals (OFF, ON, ON, OFF), thus allowing the battery unit 110 to supply a small amount of current. This operating mode is used when the power supply apparatus of the invention 100 is set in standby mode when the load 10 and the external recharging power unit 20 are not in use. In this standby power supply mode, the battery unit 110 can supply a small amount of current via the bidirectional voltage buck/boost converter unit 140 for use in the standby mode for the power supply apparatus of the invention 100 to continuously detect and monitor whether the load 10 or the external recharging power unit 20 is activated for use.

Figure 6B:
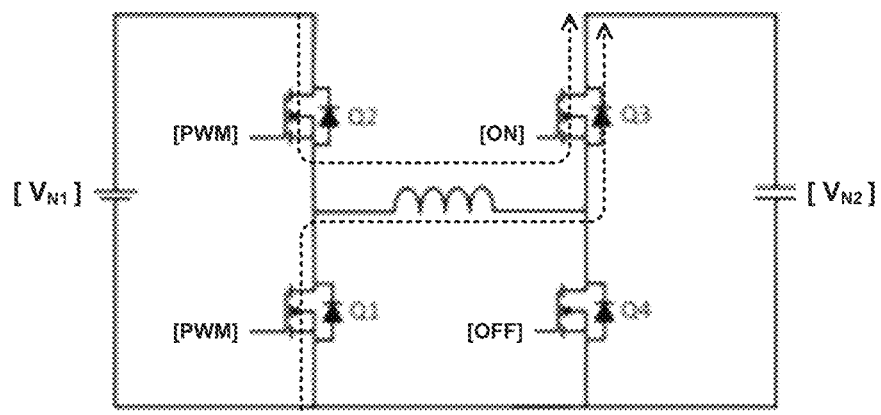
FIG. 6B is a schematic diagram showing bidirectional voltage buck/boost converter unit of FIG. 5 when being switched to a forward buck mode.

In the forward buck mode shown in FIG. 6B, the transistors (Q1, Q2, Q3, Q4) are respectively switched by the control signals (PWM, PWM, ON, OFF), wherein PWM is a train of pulses used for pulse-wide modulation (PWM) for control the voltage bucking operation. This forward buck mode is activated when the power supply apparatus of the invention 100 operates in the discharging mode, which causes the output voltage of the battery unit 110 at the first node N1 to undergo a volage bucking operation and then outputted at the second node N2 to he supplied to the load 10.

Figure 6C:
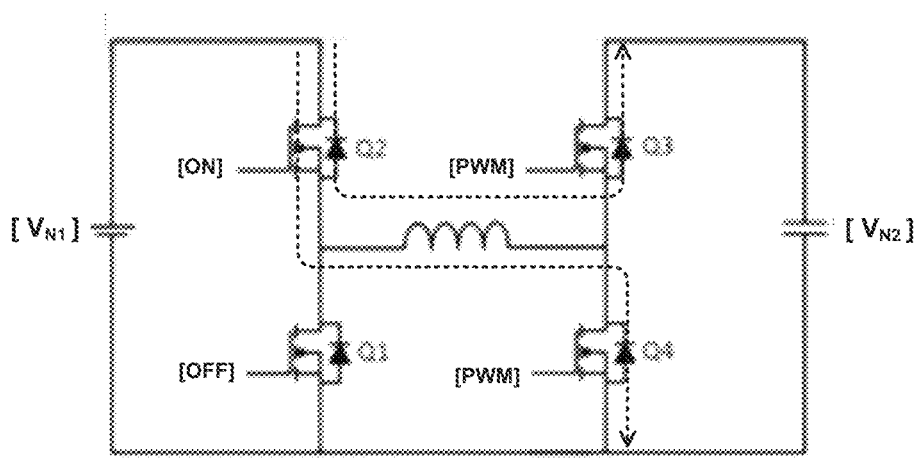
FIG. 6C is a schematic diagram showing bidirectional voltage buck/boost converter unit of FIG. 5 when being switched to a backward boost mode.

In the reverse boost mode shown in FIG. 6C, the transistors (Q1, Q2, Q3, Q4) are respectively switched by the control signals (OFF, ON, PWM, PWM), wherein PWM is a train of pulses used for pulse-wide modulation (PWM) for control the voltage boosting operation. This reverse boost mode is activated when the power supply apparatus of the invention 100 operates in the recharging mode, which causes the output voltage of the external recharging power unit 20 received at the second node N2 to undergo a volage boosting operation and then outputted at the first node N1 to be used to recharge the battery unit 110.

Since the circuit structure and operations shown in FIG. 5 and FIGS. 6A-6C are conventional and well-known, details thereof will not be described in this specification.

The first voltage-sensing unit 151 is connected to the first node N1 that lies between the battery unit 110 and the first port P1 of the bidirectional voltage buck/boost converter unit 140 for sensing and monitoring the voltage state at the first node N1. The detected voltage state signal is designated by $V_{N1}$ which is first converted into digital form and then transferred to the main control unit 160 for further processing.

The second voltage-sensing unit 152 is connected to the second node N2 that lies between the second port P2 of the bidirectional voltage buck/boost converter unit 140 and the load 10 for sensing and monitoring the voltage state at the second node N2. The detected voltage state signal is designated by $V_{N2}$, which is first converted into digital form and then transferred to the main control unit 160 for further processing.

The main control unit 160 is used to control the discharging and recharging operations of the power supply apparatus of the invention 100. In operation, when the load 10 or the external recharging power unit 20 is activated, it will trigger the main control unit 160 to respond by performing a discharging and recharging control procedure shown in FIG. 7. In this control procedure, the main control unit 160 continues to receive and monitor the two voltage state signals ($V_{N1}$, $V_{N2}$) detected respectively by the first voltage-sensing unit 151 and the second voltage-sensing unit 152 to thereby generate and issue a switch-control signal SW to the switch unit 130 and a charging/discharging control signal CH/DISCH_CTRL to the bidirectional voltage buck/boost converter unit 140 for switchably controlling the discharging and recharging operations of the battery unit 110 and the supercapacitor 120, The control procedure performed by the main control unit 160 will be later described in detail with reference to FIG. 7. In practice, the main control unit 160 can be implemented with a microprocessor, such as an embedded microprocessor, or a customized programmable logic circuit, such as ASIC (Application-Specific Integrated Circuit), FPGA (Field Programmable Gate Array), PLD (Programmable Logic Device), PLA (Programmable Logic Array), or PAL (Programmable Array Logic), to name just a few.

Details about the operation of the power supply apparatus of the invention 100 will be described in the following with reference to the flow diagram of FIG. 7, which shows a series of steps performed by the main control unit 160 for controlling the discharging and recharging operations of the battery unit 110 and the supercapacitor 120.

In operation, the power supply apparatus of the invention 100 includes two operating modes: a discharging mode and a recharging mode. In the discharging mode, the power supply apparatus of the invention 100 uses both the battery unit 110 and the supercapacitor 120 to supply power to the load 10; whereas in the recharging mode, the external recharging power unit 20 is used to supply a power for recharging both the battery unit 110 and the supercapacitor 120.

Initially when neither the load 10 nor the external recharging power unit 20 is activated, the power supply apparatus of the invention 100 is set to a standby mode In the standby mode, the switch unit 130 is preset to OFF state so that the supercapacitor 120 is disconnected from the load 10.

In operation, the power supply apparatus of the invention 100 continues to detect and monitor whether the load 10 or the external recharging power unit 20 is activated. In the event that the load 10 is activated, it will trigger the power supply apparatus of the invention 100 to operate in the discharging mode and thereby allow the battery unit 110 and the supercapacitor 120 to supply power to the load 10; whereas in the event that the external recharging power unit 20 is activated, it will trigger the power supply apparatus of the invention 100 to operate in the recharging mode and thereby allow the external recharging power unit 20 to supply a power for recharging both the battery unit 110 and the supercapacitor 120.

Figure 7:
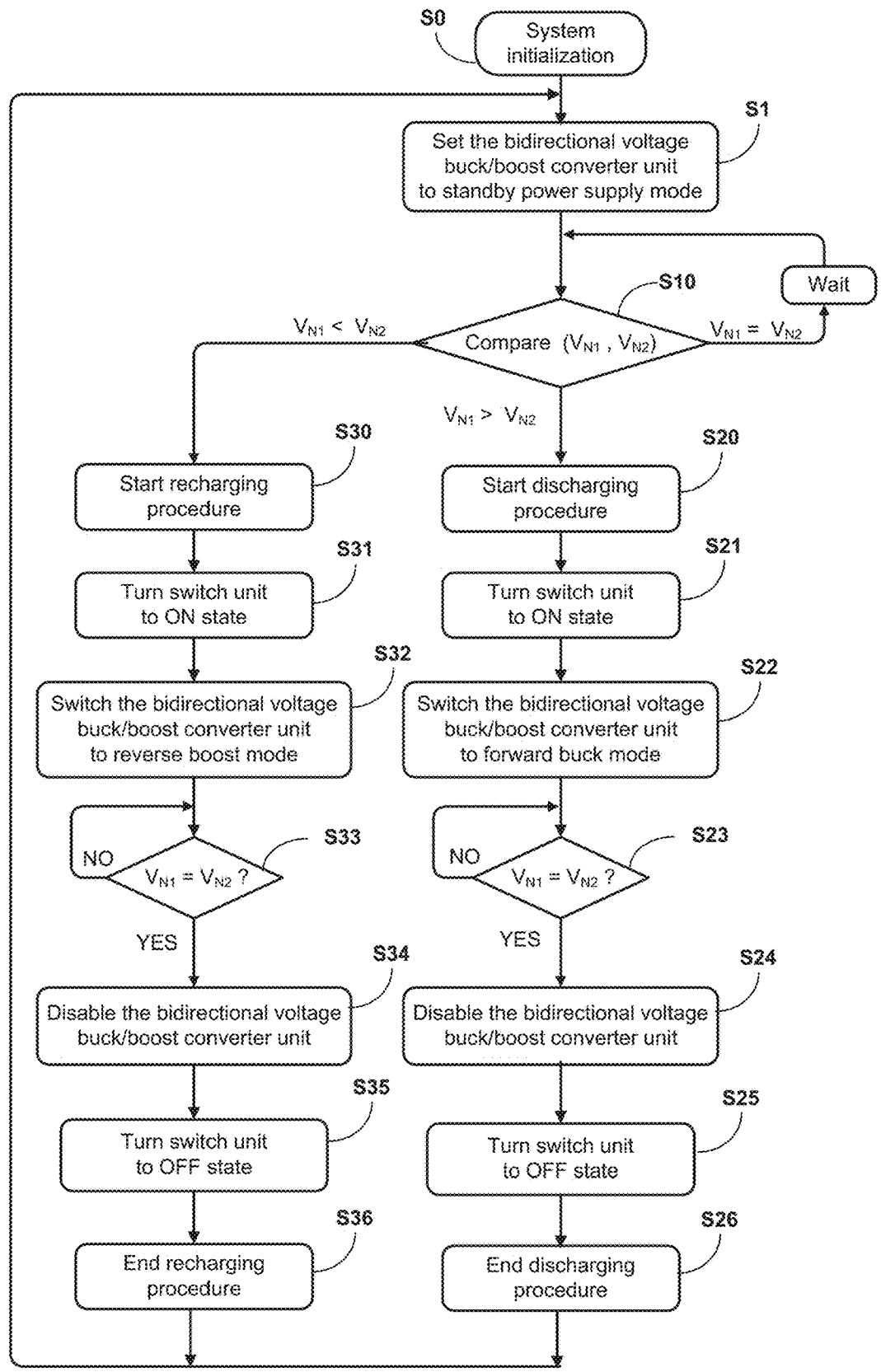
FIG. 7 is a flow diagram showing the steps performed by a main control unit utilized by the power supply apparatus of the invention.

When the power supply apparatus of the invention 100 is put into operation, it will initiate the main control unit 160 to perform the discharging and recharging control procedure shown in FIG. 7, which includes the following steps.

In Step (S0), the main control unit 160 performs system initialization.

In Step (S1), the main control unit 160 set the bidirectional voltage buck/boost converter unit 140 to the standby power supply mode as shown in FIG. 6A, thereby allowing the battery unit 110 to supply a small amount of current via the bidirectional voltage buck/boost converter unit 140. This small current is used as a standby mode power that allows the power supply apparatus of the invention 100 to operate in the standby mode for continuously detecting and monitoring whether the load 10 or the external recharging power unit 20 is activated.

In Step (S10), the main control unit 160 continues to monitor the two voltage state signals ($V_{N1}$, $V_{N2}$) which are respectively detected at the first node N1 and the second node N2 by the first voltage-sensing unit 151 and the second voltage-sensing unit 152, wherein $V_{N1}$ is the voltage state at the first node N1 connected to the battery unit 110, while $V_{N2}$ is the voltage state at the second node $N_2$ is connected to the load 10. The main control unit 160 then compares the two voltage state signals ($V_{N1}$, $V_{N2}$) as follows, If ($V_{N1}=V_{N2}$), the main control unit 160 keeps in waiting state and continues to monitor the voltage state signals ($V_{N1}$, $V_{N2}$).

If ($V_{N1}>V_{N2}$), the main control unit 160 performs Step (S20),

If ($V_{N1}<V_{N2}$), the main control unit 160 performs Step (S30),

In Step (S20), the main control unit 160 initiates and starts a discharging control procedure.

In Step (S21), the main control unit 160 issues a switch-control signal SW to turn the switch unit 130 to ON state. When turned ON, the switch unit 130 connects the supercapacitor 120 to the second node N2, thereby establishing an electrical conducting path that allows the supercapacitor 120 to supply power via the switch unit 130 to the load In Step (S22), the main control unit 160 issues a charging/discharging control signal CH/DISCH_CTRL to the bidirectional voltage buck/boost converter unit 140, thereby switching the bidirectional voltage buck/boost converter unit 140 to operate in the forward buck mode as shown in FIG. 613. This allows the battery unit 110 to operate in discharging mode, whereby the output voltage of the battery unit 110 at the first node N1 is transmitted via the discharging channel 140A of the bidirectional voltage buck/boost converter unit 140 to the load 10.

In Step (S23), the main control unit 160 continues to monitor and check the two voltage state signals ($V_{N1}$, $V_{N2}$) to see if ($V_{N1}=V_{N2}$) is true. If NOT, the switch unit 130 remains in the ON state, while the bidirectional voltage buck-boost converter unit 140 remains in the forward buck mode, Until when the condition ($V_{N1}=V_{N2}$) is true, the procedure goes to the next Step (S24).

In Step (S24), the main control unit 160 disables the charging/discharging control signal CH/DISCH_CTRL so as to disable the bidirectional voltage buck/boost converter unit 140, thereby cutting off the connection between the battery unit 110 and the load 10.

In Step (S25), the main control unit 160 issues a switch-control signal SW to turn the switch unit 130 to OFF state, thereby cutting off the electrical connection between the supercapacitor 120 and the load 10.

In Step (S26), the main control unit 160 ends the discharging procedure. After this, the procedure goes back to the Step (S1).

On the other hand, in Step (S30), the main control unit 160 initiates and starts a recharging control procedure.

In Step (S31), the main control unit 160 issues a switch-control signal SW to turn the switch unit 130 to ON state. When turned ON, the switch unit 130 connects the supercapacitor 120 to the second node N2, thereby establishing an electrical conducting path that allows the supercapacitor 120 to be electrically connected via the switch unit 130 to the external recharging power unit 20.

In Step (S32), the main control unit 160 issues a charging/discharging control signal CH/DISCH_CTRL to the bidirectional voltage buck/boost converter unit 140, thereby switching the bidirectional voltage buck/boost converter unit 140 to operate in the reverse boost mode as shown in FIG. 6C. This allows the battery unit 110 to operate in recharging mode, whereby the output voltage of the external recharging power unit 20 is received at the second node N2 and then transmitted via the recharging channel 140B of the bidirectional voltage buck/boost converter unit 140 to the battery unit 110 for recharging the battery unit 110.

Next in Step (S33), the main control unit 160 continues to monitor and check the two voltage state signals ($V_{N1}$, $V_{N2}$) to see if ($V_{N1}=V_{N2}$) is true. If NOT, the switch unit 130 remains in the ON state, while the bidirectional voltage buck/boost converter unit 140 remains in the reverse boost mode. Until when the condition ($V_{N1}=V_{N2}$) is true, the procedure goes to the next Step (S34).

In Step (S34), the main control unit 160 disables the charging/discharging control signal CH/DISCH_CTRL so as to disable the bidirectional voltage buck/boost converter unit 140, thereby cutting off the connection between the battery unit 110 and the external recharging power unit 20.

In Step (S35), the main control unit 160 issues a switch-control signal SW to turn the switch unit 130 to OH state, thereby cutting off the electrical connection between the supercapacitor 120 and the external recharging power unit 20.

In Step (S36), the main control unit 160 ends the recharging procedure. After this, the procedure goes back to the Step (S1).

Through the discharging procedure from (S20) to (S26), the power supply apparatus of the invention 100 first allows the supercapacitor 120 to supply an initial instant large current via the switch unit 130 to the load 10, and subsequently allows the battery unit 110 to supply a steady current via the discharging channel 140A of the bidirectional voltage buck/boost converter unit 140 to the load 10.

On the other hand, through the recharging procedure from (S30) to (S36), the power supply apparatus of the invention 100 allows the external recharging power unit 20 to supply a recharging voltage which is concurrently transmitted via the switch unit 130 to the supercapacitor 120 and via the recharging channel 140B of the bidirectional voltage buck/boost converter unit 140 to the battery unit 110.

When the power supply apparatus of the invention 100 is idled, i.e., neither the load 10 nor the external recharging power unit 20 is activated, the power supply apparatus of the invention 100 is set in a standby mode to continuously detect and monitor whether the load 10 or the external recharging power unit 20 is activated. In the event that the load 10 or the external recharging power unit 20 is activated, it will trigger the power supply apparatus of the invention 100 to respond by initiating the main control unit 160 to perform the control procedure shown in FIG. 7.

In conclusion, the invention provides a power supply apparatus that uses a battery unit integrally combined with a supercapacitor for supply power to a load, characterized in that the supplied power contains an initial instant large current. When recharging is required, an external recharging power unit can be activated to supply recharging power to both the supercapacitor and the battery unit. The invention therefore represents a solution to the problem mentioned in the background section and thus can be used to replace traditional lead-acid batteries for supplying power with an initial instant large current to the engine startup motor of the automobile, thereby allowing the engine startup motor to produce a more powerful and rapid accelerating force for quick startup.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements,

What is claimed is:

1. A power supply apparatus which is connectable to a load and an external recharging power unit for supplying power to the load and rechargeable by using the external recharging power unit, the power supply apparatus comprising:
    (a) a battery unit for supplying a battery power;
    (b) a supercapacitor having a super-capacitance;
    (c) a switch unit for switchably connecting the supercapacitor to the load;
    (d) a four-transistor type DC-to-DC bidirectional voltage buck/boost converter unit which is connected between the battery unit and the load and is configured to operate in either a forward buck mode or a reverse boost mode, wherein the forward buck mode is used when the battery unit operates in discharging mode while the reverse boost mode is used when the battery unit operates in recharging mode;
    (e) a first voltage-sensing unit, which is connected to a first node connected between the battery unit and the four-transistor type DC-to-DC bidirectional voltage buck/boost converter unit for sensing and monitoring the voltage state at the first node;
    (f) a second voltage-sensing unit, which is connected via the switch unit to a second node connected between the bidirectional voltage buck/boost converter and the load for sensing and monitoring the voltage state at the second node; and
    (g) a main control unit, which is configured to be initiated when the load or the external recharging power unit is activated to thereby receive the detected volage state signals from the first voltage-sensing unit and the second voltage-sensing unit for controlling the discharging and recharging of the battery unit and the supercapacitor;
    wherein
    when the load is activated, the main control unit is initiated to perform a discharging control procedure whereby the switch unit is switched to ON state while the four-transistor type DC-to-DC bidirectional voltage buck/boost converter unit is switched to a forward buck mode, thereby allowing the supercapacitor to supply an initial instant large current via the switch unit to the load, and subsequently allowing the battery unit to supply power via the four-transistor type DC-to-DC bidirectional voltage buck/boost converter unit to the load.

2. The power supply apparatus as recited in claim 1, wherein when the external recharging power unit is activated, the main control unit is initiated to perform a recharging control procedure whereby the switch unit is switched to ON state while the four-transistor type DC-to-DC bidirectional voltage buck/boost converter unit is switched to a reverse boost mode, thereby allowing the external recharging power unit to supply a recharging voltage concurrently via the switch unit to the supercapacitor and via the four-transistor type DC-to-DC bidirectional voltage buck/boost converter unit to the battery unit.

3. The power supply apparatus as recited in claim 1, wherein the load is an engine startup motor on an automobile.

4. The power supply apparatus as recited in claim 1, wherein the external recharging power unit is an electrical generator driven by an automobile engine.

5. The power supply apparatus as recited in claim 1, wherein the battery unit is a rechargeable lithium battery.

6. The power supply apparatus as recited in claim 1, wherein the four-transistor type DC-to-DC bidirectional voltage buck/boost converter unit is initially set to a standby power supply mode to allow the battery unit to supply a standby-mode power via the four-transistor type DC-to-DC bidirectional voltage buck/boost converter unit.

7. A power supply apparatus which is connectable to a load and an external recharging power unit for supplying power to the load and rechargeable by using the external recharging power unit, the power supply apparatus comprising:
    (a) a battery unit for supplying a battery power;
    (b) a supercapacitor having a super-capacitance;
    (c) a switch unit for switchably connecting the supercapacitor to the load;
    (d) a four-transistor type DC-to-DC bidirectional voltage buck/boost converter unit which is connected between the battery unit and the load and is configured to operate in either a forward buck mode or a reverse boost mode, wherein the forward buck mode is used when the battery unit operates in discharging mode while the reverse boost mode is used when the battery unit operates in recharging mode;
    (e) a first voltage-sensing unit, which is connected to a first node connected between the battery unit and the four-transistor type DC-to-DC bidirectional voltage buck/boost converter unit for sensing and monitoring the voltage state at the first node;
    (f) a second voltage-sensing unit, which is connected via the switch unit to a second node connected between the bidirectional voltage buck/boost converter and the load for sensing and monitoring the voltage state at the second node; and
    (g) a main control unit, which is configured to be initiated when the load or the external recharging power unit is activated to thereby receive the detected volage state signals from the first voltage-sensing unit and the second voltage-sensing unit for controlling the discharging and recharging of the battery unit and the supercapacitor;
    wherein
    when the load is activated, the main control unit is initiated to perform a discharging control procedure whereby the switch unit is switched to ON state while the four-transistor type DC-to-DC bidirectional voltage buck/boost converter unit is switched to a forward buck mode, thereby allowing the supercapacitor to supply an initial instant large current via the switch unit to the load, and subsequently allowing the battery unit to supply power via the four-transistor type DC-to-DC bidirectional voltage buck/boost converter unit to the load; and when the external recharging power unit is activated, the main control unit is initiated to perform a recharging control procedure whereby the switch unit is switched to ON state while the four-transistor type DC-to-DC bidirectional voltage buck/boost converter unit is switched to a reverse boost mode, thereby allowing the external recharging power unit to supply a recharging voltage concurrently via the switch unit to the supercapacitor and via the four-transistor type DC-to-DC bidirectional voltage buck/boost converter unit to the battery unit.

8. The power supply apparatus as recited in claim 7, wherein the load is an engine startup motor on an automobile.

9. The power supply apparatus as recited in claim 7, wherein the external recharging power unit is an electrical generator driven by an automobile engine.

10. The power supply apparatus as recited in claim 7, wherein the battery unit is a rechargeable lithium battery.

\* \* \* \* \*